Patented Mar. 4, 1924.

1,485,696

UNITED STATES PATENT OFFICE.

CHARLES E. NORTH, OF MONTCLAIR, NEW JERSEY, ASSIGNOR TO THE MILK OIL CORPORATION, A CORPORATION OF DELAWARE.

EXTRACTING OIL FROM MILK AND CREAM.

No Drawing.   Application filed June 14, 1922. Serial No. 568,359.

*To all whom it may concern:*

Be it known that I, CHARLES E. NORTH, a citizen of the United States of America, residing at Montclair, in the county of Essex and State of New Jersey, have invented certain new and useful Improvements in Extracting Oil from Milk and Cream, of which the following is a full, clear, and exact description.

It rarely happens that a skilled operator carrying out a new process, if he be possessed of ordinary powers of observation, does not recognize conditions met with in practise that were either unexpected or unprovided for, and is thereby led to devising means for meeting them that rise to the dignity of invention.

The improved process subject of this application for Letters Patent was the result of an experience of this nature, and was developed as a consequence of the practise of two processes for extracting oil from milk or cream which were characterized by the following steps. In both processes the cream, as an initial step, was separated from the whole milk by means of an ordinary centrifugal separator. In one process the cream was diluted with water and again passed through a centrifugal separator, this step being repeated several times, if necessary to wash the cream as perfectly as possible. The washed cream was then acidified and the oil separated out by means of a centrifugal oil separator. In the other process the cream was agitated or whipped, diluted with warm water and the melted fat recovered in a pure state by means of a centrifugal oil separator.

It was found in the practise of these processes that the acidification of the cream effected for the purpose of destroying more completely its stability, was a step requiring a somewhat higher degree of knowledge and skill than the majority of operators possess. It was also found that the character and the condition of the cream affected materially the step of whipping to bring it to exactly the proper condition for the proper carrying out of the subsequent steps of recovering the oil.

It was manifestly desirable, therefore, to devise a process which would realize as far as possible all the advantages of these two, and which could be carried out by less skilled labor, and this I have succeeded in accomplishing by carrying out the process in the following way.

I first separate out the cream from the whole milk. This cream I wash by diluting it with a volume of water about equal to that of the skim milk removed, and passing the mixture again through a separator. The product, partially washed cream, is then subjected to a second dilution and separation, and if necessary to a third, and is then diluted, heated and passed through a centrifugal oil separator by the action of which a fairly large portion, but not all, of the pure oil is extracted. The heating is not necessarily a separate or distinct step, as this may be accomplished by adding to the washed cream water at a temperature sufficiently high to melt the particles of fat.

The oil separator produces, as above stated, pure oil, and from the skim milk spout issues water, some milk serum, and all particles of fat which have not been recovered as pure oil. Up to this point, therefore, the process is imperfect, so far as the complete recovery of oil is concerned, and could hardly be classed as commercially economical, but I find that if I return the ingredients discharged from the spout back to the whole milk which is being passed into the separator, that the fat particles will be drawn off with the cream, so that eventually, practically all of the fat content of the milk will be recovered.

As a whole this process is not as rapid as those first described, because the fat particles have not coalesced, but in the end the result is practically the same, and the process may be carried out by less skilled attendants and under circumstances where the others may not be practised with the same degree of success. The process is, moreover, entirely continuous. The amount of matter returned to the whole milk is never large, and is always in a condition which renders the particles of fat readily separable for recovery. At the end of a day's run what water and other ingredients are left over, may be saved and used in the next run.

Having now described my improvement, what I claim is:

The process herein described of extracting oil from milk and cream, which consists in separating the cream out from the whole milk, diluting and washing the cream by the centrifugal action of a separator of the same form until practically all of the casein is removed, diluting and melting the fat contained in the cream, passing the same through an oil separator and returning the fluid comprising the wash water, milk serum and unrecovered fat particles back to the whole milk prior to its being subjected to the initial step of separation.

In testimony whereof I hereto affix my signature.

CHARLES E. NORTH.